US009581457B1

(12) United States Patent
Meredith et al.

(10) Patent No.: US 9,581,457 B1
(45) Date of Patent: Feb. 28, 2017

(54) SYSTEM AND METHOD FOR DISPLAYING POINTS OF INTEREST ON A HEADS-UP DISPLAY

(71) Applicants: AT&T INTELLECTUAL PROPERTY I, L.P., Atlanta, GA (US); AT&T Mobility II LLC, Atlanta, GA (US)

(72) Inventors: Sheldon K. Meredith, Roswell, GA (US); William Cottrill, Canton, GA (US); Rick Tipton, Corryton, TN (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/958,331

(22) Filed: Dec. 3, 2015

(51) Int. Cl.
*G01C 21/36* (2006.01)
(52) U.S. Cl.
CPC .................. *G01C 21/3602* (2013.01)
(58) Field of Classification Search
CPC ............. G01C 21/3602; G06Q 20/401; G06Q 30/0207; G06Q 40/08
USPC ........................................................ 701/523
See application file for complete search history.

(56) References Cited

U.S. PATENT DOCUMENTS

| | | |
|---|---|---|
| 6,272,431 B1 | 8/2001 | Zamojdo et al. |
| 7,084,859 B1 | 8/2006 | Pryor |
| 7,796,056 B2 | 9/2010 | Fein et al. |
| 8,098,170 B1 | 1/2012 | Szczerba et al. |
| 8,358,224 B2 | 1/2013 | Seder et al. |
| 8,514,101 B2 | 8/2013 | Mathieu et al. |
| 8,521,411 B2 | 8/2013 | Grabowski et al. |
| 8,686,872 B2 | 4/2014 | Szczerba et al. |

(Continued)

FOREIGN PATENT DOCUMENTS

| | | |
|---|---|---|
| DE | 102008060766 | 9/2009 |
| WO | 2014095068 | 6/2014 |

OTHER PUBLICATIONS

Alabaster, "Pioneer launches car navigation with augmented reality, heads-up displays," www.computerworld.com, Jun. 28, 2013. http://www.computerworld.com/article/2498299/personal-technology/pioneer-launches-car-navigation-with-augmented-reality--heads-up-displays.html.

(Continued)

*Primary Examiner* — McDieunel Marc
(74) *Attorney, Agent, or Firm* — Akerman LLP; Michael K. Dixon; Mammen (Roy) P. Zachariah, Jr.

(57) ABSTRACT

A system for displaying points of interest on a heads-up display is disclosed. In particular, the system may utilize vehicular cameras, a touchscreen device, and a heads-up display to provide the functionality supported by the system. The system enables a user to select a point of interest within a field of view on the touchscreen device. Based on the selection of the point of interest, the system may display information associated with the point of interest on the heads-up display. The point of interest may be determined by the location of the vehicle, the vehicle's azimuth, and the real-time measured distance to an object corresponding to the point of interest. In order to accurately display the point of interest information at the correct location on the heads-up display, the system may utilize a calibration mechanism specific to the user to determine the correct location.

20 Claims, 6 Drawing Sheets

(56) References Cited

U.S. PATENT DOCUMENTS

| | | |
|---|---|---|
| 8,686,922 B2 | 4/2014 | Breed |
| 8,692,739 B2 | 4/2014 | Mathieu et al. |
| 8,924,150 B2 | 12/2014 | Tsimhoni et al. |
| 8,947,219 B2 | 2/2015 | Popovic |
| 8,977,489 B2 | 3/2015 | Szczerba et al. |
| 8,994,558 B2 | 3/2015 | Kim et al. |
| 2005/0065721 A1 | 3/2005 | Herrtwich et al. |
| 2006/0167784 A1* | 7/2006 | Hoffberg ............... G06Q 20/401 705/37 |
| 2010/0238161 A1 | 9/2010 | Varga et al. |
| 2011/0004513 A1* | 1/2011 | Hoffberg ............ G06Q 30/0207 705/14.1 |
| 2011/0310087 A1 | 12/2011 | Wright et al. |
| 2012/0224060 A1 | 9/2012 | Gurevich et al. |
| 2013/0073194 A1 | 3/2013 | Nakamura et al. |
| 2015/0025917 A1* | 1/2015 | Stempora ............... G06Q 40/08 705/4 |
| 2015/0066360 A1 | 3/2015 | Kirsch |

OTHER PUBLICATIONS

Stewart, "Jaguar Reveals Game-Like Head-Up Display," Jul. 10, 2014, www.automotive.com.http://www.automotive.com/news/1407-jaguar-reveals-game-like-head-up-display/.

Pratap, "Navdy Launches Car Heads-Up Display for Android and iOS Smartphones," NDTV Gadgets, gadgets.ndtv.com, Aug. 6, 2014. http://gadgets.ndtv.com/mobiles/news/navdy-launches-car-heads-up-display-for-android-and-ios-smartphones-571730.

* cited by examiner

SYSTEM AND METHOD FOR DISPLAYING POINTS OF INTEREST ON A HEADS-UP DISPLAY

FIELD OF THE INVENTION

The present application relates to display technologies, camera technologies, touchscreen technologies, and vehicle safety technologies, and more particularly, to a system and method for displaying points of interest on a heads-up display.

BACKGROUND

In today's society, users have become increasingly comfortable with technology in terms of performing their daily tasks, which include, but are not limited to, placing telephone calls, sending text messages, accessing internet services, streaming media content, performing work, performing any other tasks, or any combination thereof. While such technology often creates efficiencies, improves users' quality of life, and facilitates the exchange of information on a grand scale, such technology also may serve as a source of distraction for users. For example, as smartphones have become ubiquitous, an increasing number of users regularly send text messages or access the internet while driving their vehicles. Unfortunately, when users send such text messages or access the internet while driving, they often do so by taking their eyes off the road to view the screen of whatever device that they are using to send the text messages or access the internet. As a result, such actions lead to severely impaired vehicle safety, which often leads to traffic accidents, pedestrian fatalities, and a host of other safety-related issues.

Now that the safety issues and problems associated with using mobile devices while driving have become so widespread, state legislatures and other governing bodies have begun to legally prohibit certain uses of mobile devices while driving. While current versions of hands-free headsets and heads-up displays provide substantial ways of increasing vehicle safety by increasing the probability that users' eyes are on the road, the current versions of such technologies still have shortcomings. For example, current versions of headsets often cover the users' ears and often interfere with the users' perception of noises occurring outside the vehicles that the users are driving. Additionally, current versions of heads-up displays often fail to provide enough information to prevent the users from visually inspecting their mobile devices while driving. As a result, current methodologies and technologies associated with heads-up displays may be enhanced and improved so as to provide enhanced quality-of-service for users. Such enhancements and improvements to methodologies and technologies may provide for improved user satisfaction and increased vehicle safety.

SUMMARY

A system and accompanying methods for displaying points of interest on a heads-up display are disclosed. In particular, the system and methods may include enabling a driver, pilot, or other user to select a special operating mode of a touchscreen device, such as a mobile smartphone, mounted touchscreen device, or a combination thereof, to select and display points of interest on a heads-up display of a vehicle. In particular, as a user manually probes a touchscreen device that displays objects existing in the user's field of view, the names and attributes of points of interest that are selected via the touchscreen device may be displayed on the heads-up display of the vehicle. If the wrong point of interest is indicated in the heads-up display, the user may move their finger on the touchscreen device to change the point of interest. Notably, the systems and methods enable the display of attributes of points of interest without the user having to take his or her eyes off the road. By doing so, the systems and methods dramatically improve vehicle safety, while simultaneously providing valuable information to the user.

In order to accomplish the foregoing, the systems and methods may include detecting that user has touched or otherwise contacted a touchscreen of a touchscreen device to select a point of interest, such as an object within a field of view of the user. In response to the touching, the systems and methods may collect the global positioning system (GPS) location of the vehicle in real-time, along with the vehicle's pointing azimuth, such as from a compass of the vehicle. Once the GPS location of the vehicle and the vehicle's pointing azimuth are determined, the systems and methods may include utilizing one or more cameras of the vehicle to use one or more autofocus techniques to determine the approximate distance to various objects in the user's field of view. In certain embodiments, the view provided on the touchscreen device may be geometrically and statically related to the field of view of the one or more cameras of the vehicle. When the user touches the touchscreen of the touchscreen device, the systems and methods may directly indicate a relative azimuth and elevation from a central reference point located at the front of the vehicle. This, for example, could be utilized to put a dot/cursor on the heads-up display.

Once the GPS location, the vehicle's pointing azimuth, and the distance to the various objects in the user's field of view are determined, the systems and methods may proceed to perform a computation using this information to determine which point of interest the user selected via the touchscreen device. For example, the systems and methods may transmit the results of the computation to a remote server or to a local database of the vehicle to match the computed information to previously stored information that may be utilized to identify the point of interest selected by the user. Once the point of interest is identified and determined, the systems and methods may display the name and other information associated with the point of interest on a heads-up display of the vehicle. The name and other information may be displayed at a position on the heads-up display that corresponds to the point of interest being looked at through the windshield of the vehicle. In certain embodiments, the systems and methods may provide the user with a mechanism for displaying various types of metadata associated with the point of interest on the heads-up display. In certain embodiments, the systems and method may factor in a calibration offset that is tailored to the user (such as the user's viewing angle, seat position, or height) so as to adjust the display of the information on the heads-up display to ensure appropriate visual alignment of the information to the specific user.

In one embodiment, a system for displaying points of interest on a heads-up display is disclosed. The system may include a memory that stores instructions and a processor that executes the instructions to perform various operations of the system. The system may perform an operation that includes determining a first position at which a first contact is made on a touchscreen of a device. The first position may correspond with an object that is in a field of view of a user of a vehicle. In response to the first contact, the system may perform an operation that includes determining a vehicle location and an azimuth angle with respect to a reference point in front of the vehicle. The system may then perform an operation that includes determining a distance to the object in the field of view of the user. The distance to the object may be determined from image content obtained from a camera of the vehicle. The system may proceed to perform an operation that includes determining a location of the object based on the vehicle location, the azimuth angle, and the distance to the object. Additionally, the system may perform an operation that includes determining if the location of the object corresponds with a point of interest. Furthermore, the system may perform an operation that includes displaying, if the location of the object is determined to correspond with the point of interest, information corresponding to the point of interest on a second position of a heads-up display of the vehicle. In certain embodiments, the second position of the heads-up display may correspond with the first position at which the first contact was made on the touchscreen of the device.

In another embodiment, a method for displaying points of interest on a heads-up display is disclosed. The method may include utilizing a memory that stores instructions, and a processor that executes the instructions to perform the various functions of the method. In particular, the method may include determining a first position at which a first contact is made on a touchscreen of a device. The first position may correspond with an object in a field of view of a user of a vehicle. In response to the first contact, the method may include determining a vehicle location and an azimuth angle with respect to a reference point in front of the vehicle. Additionally, the method may include determining a distance to the object in the field of view of the user. The distance to the object may be determined from image content obtained from a camera of the vehicle. The method may also include determining a location of the object based on the vehicle location, the azimuth angle, and the distance to the object. Furthermore, the method may include determining if the location of the object corresponds with a point of interest. Moreover, the method may include displaying, if the location of the object is determined to correspond with the point of interest, information corresponding to the point of interest on a second position of a heads-up display of the vehicle. The second position of the heads-up display may correspond with the first position at which the first contact was made on the touchscreen of the device, and the second position may be calibrated based on a calibration offset associated with the user.

According to yet another embodiment, a computer-readable device having instructions for displaying points of interest on a heads-up display is provided. The computer instructions, which when loaded and executed by a processor, may cause the processor to perform operations including: determining a first position at which a first contact is made on a touchscreen of a device, wherein the first position corresponds with an object in a field of view of a user of a vehicle; determining, in response to the first contact, a vehicle location and an azimuth angle with respect to a reference point in front of the vehicle; determining a distance to the object in the field of view of the user, wherein the distance is determined from image content obtained from a camera of the vehicle; calculating a location of the object based on the vehicle location, the azimuth angle, and the distance to the object; determining if the location of the object corresponds with a point of interest; and displaying, if the location of the object is determined to correspond with the point of interest, information corresponding to the point of interest on a second position of a heads-up display of the vehicle, wherein the second position of the heads-up display corresponds with the first position at which the first contact was made on the touchscreen of the device.

These and other features of the systems and methods for displaying points of interest on a heads-up display are described in the following detailed description, drawings, and appended claims.

DETAILED DESCRIPTION OF THE INVENTION

Figure 1:
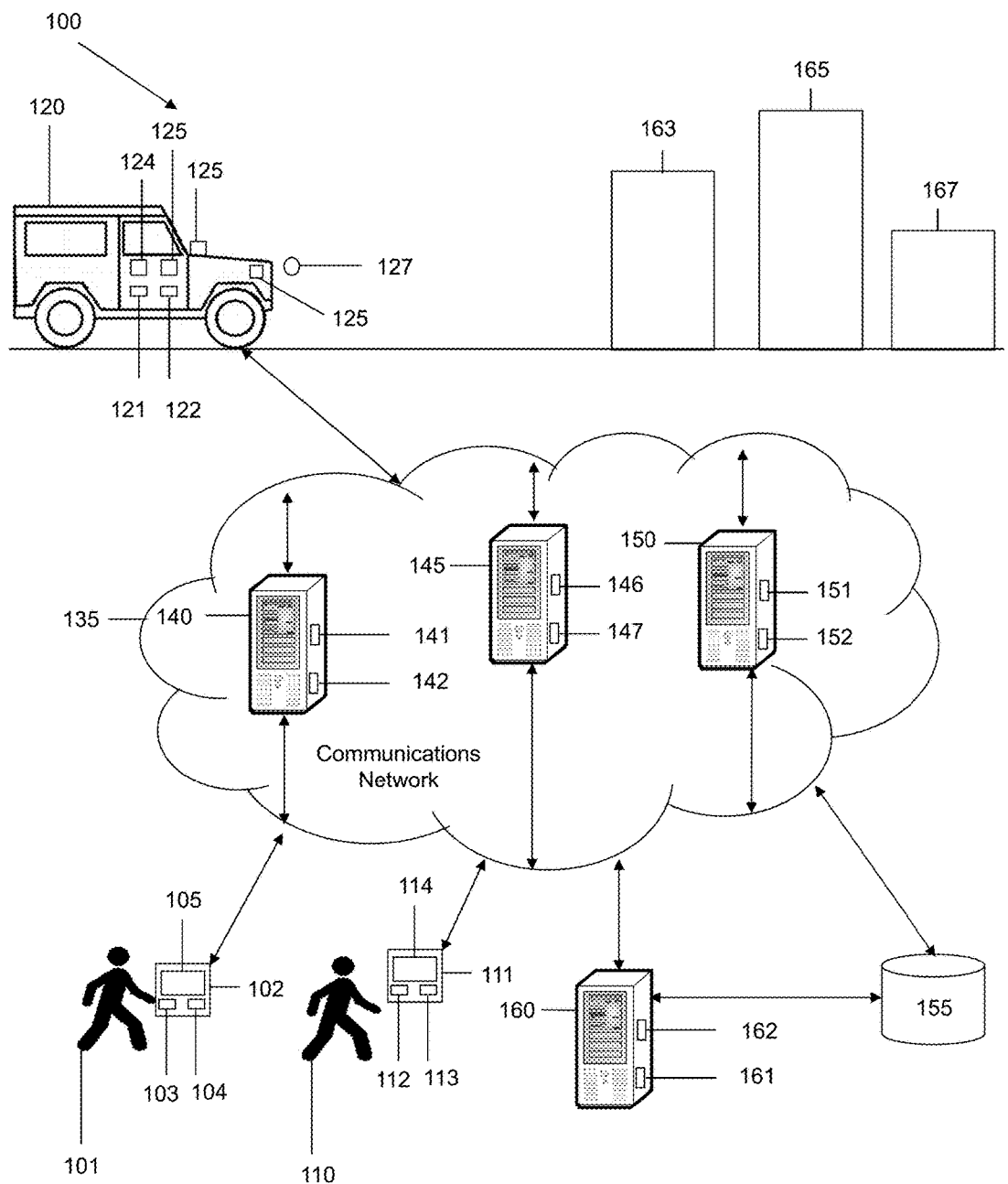
FIG. 1 is a schematic diagram of a system for displaying points of interest on a heads-up display according to an embodiment of the present disclosure.

A system 100 and accompanying methods for displaying points of interest on a heads-up display 134 are disclosed. In particular, the system 100 and methods may include enabling a driver, pilot, or other user (e.g. first or second users 101, 110) to select a special operating mode of a touchscreen device, such as a mobile smartphone (e.g. first user device 102), mounted touchscreen device (e.g. touchscreen device 130), or a combination thereof, to select and display points of interest on a heads-up display 134 of a vehicle 120. In particular, as a user manually probes a touchscreen device that displays objects existing in the user's field of view, the names and attributes of points of interest that are selected via the touchscreen device may be displayed on the heads-up display 134 of the vehicle 120. If the wrong point of interest is indicated in the heads-up display 134, the user may move their finger on the touchscreen device to change the point of interest. Notably, the system 100 and methods enable the display of attributes of points of interest without the user having to take his or her eyes off the road. By doing so, the system 100 and methods dramatically improve vehicle safety, while simultaneously providing valuable information to the user.

In order to accomplish the foregoing, the system 100 and methods may include detecting that user has touched or otherwise contacted a touchscreen of a touchscreen device to select a point of interest, such as an object (e.g. objects 163, 165, 167) within a field of view of the user. In response to the touching, the system 100 and methods may collect the global positioning system (GPS) location of the vehicle 120 in real-time, along with the vehicle's 120 pointing azimuth 202, such as from a compass of the vehicle 120. Once the GPS location of the vehicle 120 and the vehicle's 120 pointing azimuth 202 are determined, the system 100 and methods may include utilizing one or more cameras 125 of the vehicle 120 to use one or more autofocus techniques to determine the approximate distances to various objects in the user's field of view. In certain embodiments, the view provided on the touchscreen device may be geometrically and statically related to the field of view of the one or more cameras 125 of the vehicle 120. When the user touches the touchscreen of the touchscreen device, the system 100 and methods may directly indicate a relative azimuth and elevation from a central reference point 127 located at the front of the vehicle 120. This, for example, could be utilized to put a dot/cursor 170 on the heads-up display 134.

Once the GPS location, the vehicle's pointing azimuth 202, and the distance to the various objects in the user's field of view are determined, the system 100 and methods may proceed to perform a computation using this information to determine which point of interest the user selected via the touchscreen device. For example, the system 100 and methods may transmit the results of the computation to a remote server (e.g. server 160) or to a local database 124 of the vehicle 120 to match the computed information to previously stored information that may be utilized to identify the point of interest selected by the user. Once the point of interest is identified and determined, the system 100 and methods may display the name and other information associated with the point of interest on a heads-up display 134 of the vehicle 120. The name and other information may be displayed at a position on the heads-up display 134 that corresponds to the point of interest/object being looked at through the windshield 123 of the vehicle 120. In certain embodiments, the system 100 and methods may provide the user with a mechanism for displaying various types of metadata associated with the point of interest on the heads-up display 134. In certain embodiments, the system 200 and method may factor in a calibration offset that is tailored to the user (such as the user's viewing angle or height) so as to adjust the display of the information on the heads-up display 134 to ensure appropriate visual alignment of the information to the specific user.

Figure 2:
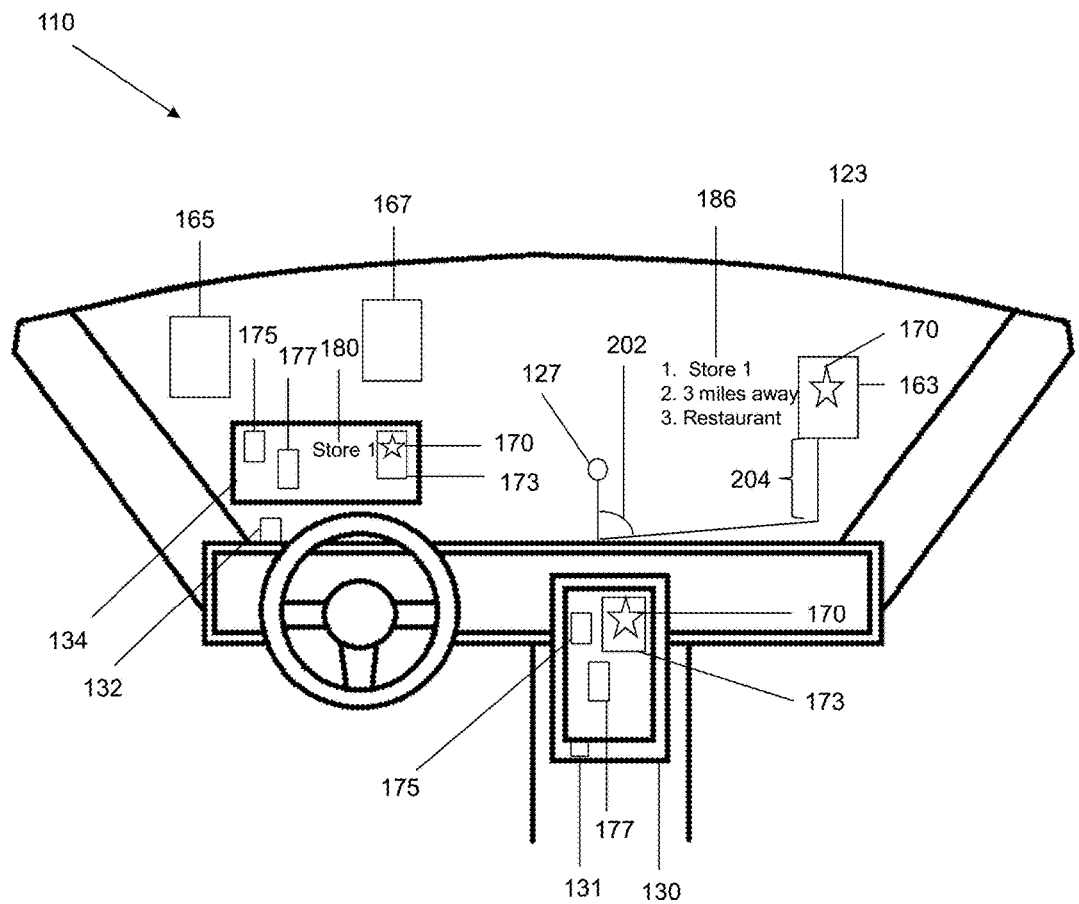
FIG. 2 is a schematic diagram illustrating the display of points of interest on a heads-up display as viewed from the interior of a vehicle according to an embodiment of the present disclosure.
Figure 3:
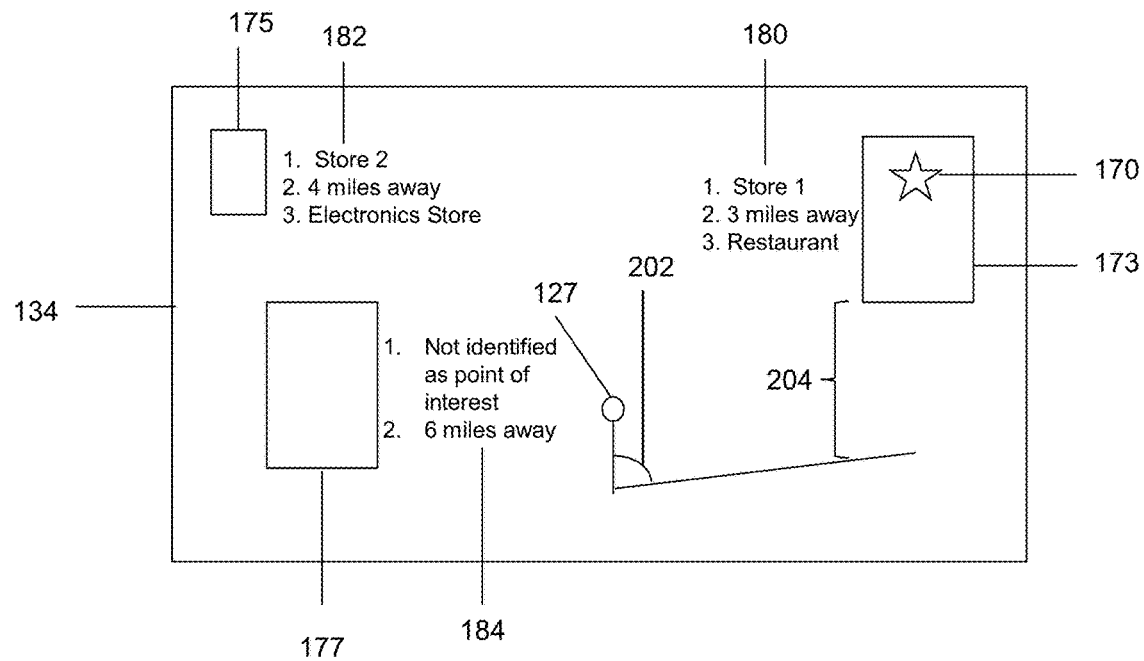
FIG. 3 is a schematic diagram illustrating the heads-up display of FIG. 2 displaying points of interest based on the functionality provided by the system in FIG. 1.

As shown in FIGS. 1-3, a system 100 for displaying points of interest on a heads-up display 134 is disclosed. The system 100 may be configured to support, but is not limited to supporting, content delivery services, cloud computing services, IP Multimedia Subsystem (IMS) services, GPS services, navigation services, heads-up display services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. As another example, the first user 101 may utilize first user device 102 to control one or more functions of the vehicle 120 and/or the heads-up display device 132. In certain embodiments, the first user 101 may be a subscriber of a service provider that controls communications network 135.

The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include a touchscreen 105, which may serve as an input device for a visual display of the first user device 102. The touchscreen 105 may receive inputs, such as via the first user's 101 finger, a stylus, and/or other device, to control applications executing on the first user device 102, control features and functions of the vehicle 120, control the first user device 102, control the cameras 125, control the heads-up display device 132, perform any desired functions, or any combination thereof. In certain embodiments, the first user device 102 may be a computer, a laptop, a tablet device, a phablet, a server, a mobile device, a smartphone, a smart watch, any other type of computing device, or any combination thereof. Illustratively, the first user device 102 is shown as a smartphone device in FIG. 1.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by content and service providers associated with the communications network 135 or any other network in the system 100. Also, as another example, the second user 110 may utilize second user device 111 to control one or more functions of the vehicle 120 and/or the heads-up display device 132. In certain embodiments, the second user 110 may be a subscriber of a service provider that controls communications network 135. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include a touchscreen 114, which may serve as an input device for a visual display of the second user device 111. The touchscreen 114 may receive inputs, such as via the second user's 110 finger, a stylus, and/or other device, to control applications executing on the second user device 111, control features and functions of the vehicle 120, control the second user device 111, control the cameras 125, control the heads-up display device 132, perform any desired functions, or any combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a computer in FIG. 1.

In certain embodiments, the first user device 102 and the second user device 111 may have any number of software applications and/or application services stored and/or accessible thereon. For example, the first and second user devices 102, 111 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. Additionally, the first and second user devices 102, 111 may include applications that may be utilized to control the heads-up display device 132, the vehicle 120, the heads-up display 134, any of the devices in the system 100, or any combination thereof. In certain embodiments, the software applications and services may include one or more graphical user interfaces so as to enable the first and second users 101, 110 to readily interact with the software applications. The first and second users 101, 110 may interact with the graphical user interfaces of the applications and services by utilizing the touchscreens 105 and 114 respectively. The software applications and services may also be utilized by the first and second users 101, 110 to interact with the any device in the system 100, any network in the system 100, or any combination thereof. In certain embodiments, the first user device 102 and the second user device 111 may include associated telephone numbers, device identities, or any other identifiers to uniquely identify the first and second user devices 102, 111.

The system 100 may include a vehicle 120, which may be any type of vehicle, such as, but not limited to, a car, a truck, a train, a plane, a boat, a ship, a trolley, a motorcycle, a bike, any type of vehicle, any type of moving device, or any combination thereof. In certain embodiments, the vehicle 120 may be driven by the first user 101, the second user 110, or both. In certain embodiments, the vehicle 120 may be any type of mobile connected device, such as an unmanned mobile connected vehicle (e.g. autonomous vehicle), a passenger vehicle, or a combination thereof. In certain embodiments, the first user 101 may have his own vehicle 120 and the second user 110 may also have his own vehicle 120. The vehicle 120 may include a memory 121 that includes instructions, and a processor 122 that executes the instructions from the memory 121 to perform the various operations that are performed by the vehicle 120. In certain embodiments, the processor 122 may be hardware, software, or a combination thereof. The vehicle 120 may also include a windshield 123, which may be a windshield 123 capable of allowing a heads-up display 134 to be displayed on the windshield 123 of the vehicle 120.

In certain embodiments, the vehicle 120 may also include a local database 124, which may be configured to communicate with the processor 122 and memory 121 of the vehicle 120. The local database 124 may be configured to store any data associated with the vehicle 120, any data traversing the system 100, any data associated with the first and second users 101, 110, any data associated with the first and second user devices 102, 111, any data associated with the objects 163, 165, 167, any data associated with the heads-up display device 132, any data associated with the heads-up display 134, any other data in the system 100, or any combination thereof. For example, the local database 124 may store user profiles of the first and second users 101, 110 that may include information such as, but not limited to, name information, height information, weight information, location information, preferences relating to preferred colors for information displayed on the heads-up display 134, preferences relating to preferred drivers' seating positions in the vehicle 120 for the first and second users 101, 110, information identifying preferred viewing angles for the first and second users 101, 110, information identifying preferred types of metadata and other data to be displayed on heads-up display 134 for the first and second users 101, 110, information identifying specific calibration offsets for the first and second users 101, 110 for adjusting the location at which the heads-up display device 132 projects the heads-up display 134, any other information, or any combination thereof.

In certain embodiments, the local database 124 may store information associated with various points of interest, information that may be utilized to match objects 163, 165, 167 to various points of interest, GPS information for the vehicle 120, azimuth 202 information for the vehicle 120, azimuth 202 information with respect to the objects 163, 165, 167, elevation 204 information for any number of objects 163, 165, 167, elevation 204 information for the vehicle 120, data and metadata associated with points of interest that may be displayed on heads-up display 134, any other information, or any combination thereof. In certain embodiments, the local database 124 may be queried by the system 100 to determine whether a particular object 163, 165, 167 corresponds with a previously-identified point of interest, such as, but not limited to, a store, a restaurant, a gas station, a theme park, a garage, any type of point of interest, or any combination thereof. The local database 124 may be communicatively linked with any device in the system 100, such as, but not limited to, database 155, servers 140, 145, 150, 160, first and second user devices 102, 111, heads-up display device 132, or any combination thereof.

The vehicle 120 may also include one or more cameras 125, which may be utilized to record and/or stream images and motion content of anything within the viewing range of the cameras 125. For example, the cameras 125 may be utilized to record and/or stream images and motion content taken of the objects 163, 165, and 167, which may be in front of the vehicle 120 as the vehicle 120 is driving. In certain embodiments, the cameras 125 may be utilized to provide captured images and motion content to one or more display devices, such as, but not limited to, touchscreen device 130, first and second user devices 102, 111, heads-up display device 132, any other display device, or any combination thereof, so that the captured images and motion content may be viewed. Any number of cameras 125 may be included on the vehicle 120, and the cameras 125 may be positioned at any desired location on the vehicle 120. In certain embodiments, preferred locations for the cameras 125 may be in front of the windshield 123 of the vehicle 120, near the side view mirrors of the vehicle 120, in the front bumper of the vehicle 120, in the rear bumper of the vehicle 120, on the trunk of the vehicle 120, on top of the vehicle 120, at a position that correlates with the first and/or second user's 101, 110 eye level while seated in the vehicle 120, or any combination thereof. Notably, any images and/or motion content recorded by the cameras 125 may be transmitted and/or stored on any device in the system 100.

Additionally, the vehicle 120 may include a touchscreen device 130 that includes a touchscreen that may be configured to serve as an input device for the touchscreen device 130, the vehicle 120, the heads-up display device 132, any other device, or any combination thereof. The touchscreen of the touchscreen device 130 may receive inputs, such as via one or more fingers of the first and second users 101, 110, a stylus, and/or other device, that may be utilized to control applications executing on the touchscreen device 130, control features and functions of the vehicle 120, control the first and second user devices 102, 111, control the cameras 125, control the heads-up display device 132, control the heads-up display 134, control any of the components of the vehicle 120, control the local database 124, perform any desired functions, or any combination thereof. In certain embodiments, the touchscreen device 130 may be activated and deactivated by utilizing the controller 131. In certain embodiments, the controller 131 may be utilized to activate, deactivate, and/or control the heads-up display device 132, the cameras 125, the local database 124, the processor 122, the memory 121, any device in the system 100, or any combination thereof. In certain embodiments, instructions to perform operations of the touchscreen device 130 may be stored in the memory 121, and the instructions to perform the operations may be executed by the processor 122 of the vehicle 120.

The vehicle 120 may further include a heads-up display device 132, which may be utilized to project or otherwise display a heads-up display 134 onto the windshield 123 of the vehicle 120. In certain embodiments, the heads-up display device 132 may display the heads-up display 134 on other desired areas of the vehicle 120, such as, but not limited to, passenger side windows, rear windows, side view mirrors, rearview mirrors, the console of the vehicle 120, or any combination thereof. The heads-up display device 132 may include a projector unit, a combiner, and/or a computing device for generating video and other content to be displayed by the heads-up display device 132. The heads-up display device 132 may be any type of heads-up display device and may include any type of heads-up display functionality. For example, the heads-up display device 132 may utilize a cathode ray tube to generate an image on a phosphor screen, a light emitting diode modulated by a liquid crystal display (LCD) screen to display images and content for the heads-up display 134, optical waveguides to produce images directly within the combiner of the heads-up display device 132, lasers to display images and other media content on a medium, any other heads-up display technology, or any combination thereof, to provide heads-up display technology.

In certain embodiments, the heads-up display device 132 may be controlled by the first user device 102, the second user device 111, the controller 131, the touchscreen device 130, the vehicle 120, any other appropriate device, or any combination thereof. The heads-up display device 132 may display any type of content through the heads-up display 134. For example, the heads-up display device 132 may display point of interest information, information identifying objects 163, 165, 167, information identifying objects 163, 165, 167 as identified points of interest, metadata associated with the objects 163, 165, 165, metadata associated with the first and second users 101, 110, media content captured by the cameras 120, GPS location information for the vehicle 120, distance information associated with a distance from the vehicle 120 to the objects 163, 165, 167, temperature readings taken from temperature sensors of the vehicle 120, light level readings taken from light sensors of the vehicle 120, motion sensor information from a motion sensor of the vehicle 120, user profile information for the first and second users 101, 110, information relating to one or more features and applications of the first and second user devices 102, 111, any other information, or any combination thereof. In certain embodiments, the heads-up display device 132 may display the heads-up display 134 in a selected region of the windshield 123. For example, in FIG. 2, the heads-up display 134 is displayed on a portion of the windshield 123 that is right in line with a user's eye level and right above the steering wheel of the vehicle 120. In certain embodiments, the heads-up display 134 may take up the entire windshield 123, various portions of the windshield 123, or any combination thereof.

In certain embodiments, the heads-up display device 132 may receive calibration information, such as calibration offset information so that the heads-up display 134 that is projected by the heads-up display device 132 may be positioned at a location on the windshield 123 that is appropriate for a particular user's specific viewing angle, height, or other characteristics. For example, if the first user 101 is short in stature, height identifying information from the first user's 101 profile, along with calibration offset information, may be utilized by the head-up display device 132 to adjust the position of the heads-up display 134 to a location on the windshield 123 that is lower than the position of the heads-up display 134 utilized for the second user 110, who may be tall in stature. Each user, such as first user 101 and second user 110, may have their own calibration settings for the heads-up display 134, which may be loaded in each of their user profiles. The calibration settings may be provided to the heads-up display device 132 via the touchscreen device 130, the first and second user devices 102, 111, each respective user's key fobs, the local database 124, the database 155, any other device in the system 100, or any combination thereof.

The heads-up display device 132 may also be configured to adjust the heads-up display 134 based on one or more preferences specified by the first and second users 101, 110. For example, the user profiles of the first and second users 101, 110 may specify which colors the heads-up display 134 should be displayed in for the first and second users 101, 110 respectively, the brightness levels for the heads-up display 134 for the first and second users 101, 110 respectively, what type of point of interest information should be displayed for the first and second users 101, 110 respectively (e.g. name of the point of interest, location of the point of interest, the type of point of interest, a picture of the point of interest, information describing the point of interest, etc.), what type of media content (e.g. image content, video content, etc.) may be displayed on the heads-up display 134, or any combination thereof. In certain embodiments, the heads-up display device 132 may project a dot or cursor onto the heads-up display 134 that may track a similar dot or cursor displayed on the touchscreen device 130, the touchscreen 105 of the first user device 102, and/or the touchscreen 114 of the second user device 111. For example, the first user 101 may move a dot/cursor (e.g. dot/cursor 170) displayed on the touchscreen device 130 to select an object (e.g. object 163) displayed on the touchscreen of the touchscreen device 130 via the video feed provided by the cameras 125. When the first user 101 moves the dot/cursor on top of the object displayed on the touchscreen using his or her finger, a similar dot/cursor may be moved on top of a visual representation of the object that is displayed on the heads-up display 134. The positions of the dots/cursors on the heads-up display 134, the touchscreen device 130, the first and second user devices 102, 111, or any combination thereof, may be calibrated appropriately by the system 100 to ensure that each of the dots/cursors track each other in a proportionate and appropriate manner.

The vehicle 120 may further include one or more sensors. The sensors may be positioned at any desired location on the vehicle 120 and may include, but are not limited to, light sensors, temperature sensors, motion sensors, barometric sensors, acoustic sensors, air flow sensors, speed sensors, tilt sensors, any type of sensor, or any combination thereof. The vehicle 120 may also include gyroscopes, accelerometers, GPS devices, navigation devices, LIDAR devices, tachometers, any other type of devices, or any combination thereof. Any information obtained from any of the sensors or devices may be transmitted to the processor 122 and/or memory 121. The information may be processed by the processor 122 and may be provided to the heads-up display device 132 for display on the heads-up display 134, display on the touchscreen device 130, display on the first and second user devices 102, 111, or any combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by a company, the first and second users 101, 110, or a combination thereof. The communications network 135 may also include and be connected to a cloud-computing network, an IMS network, a connected-drive network, a vehicle network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150, and 160 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the vehicle 120, the local database 124, the servers 140, 145, 150, 160, the first user device 102, the second user device 111, the heads-up display device 132, the touchscreen device 130, any devices in the system 100, any other device, any network, or any combination thereof.

The database 155 may also store information and metadata obtained from the system 100, store metadata and other information associated with the first and second users 101, 110, store user profiles associated with the first and second users 101, 110, store device profiles associated with any device in the system 100 (e.g. first and second user devices 102, 111), store communications traversing the system 100, store user preferences (e.g. preferences associated with what is displayed on the heads-up display 134), store information associated with any device or signal in the system 100, store information relating to patterns of usage relating to the first and second user devices 102, 111, store any information obtained from any of the networks in the system 100, store historical data associated with the first and second users 101, 110, store device characteristics, store information relating to any devices associated with the first and second users 101, 110, store any information associated with the objects 163, 165, 167, store information relating to the vehicle 120, store point of interest information that may be utilized to match an object 163, 165, 167 to a particular point of interest, store metadata for a point of interest (e.g. the type of point of interest, information describing the point of interest, how far the point of interest is from a current location, a rating of the point of interest, and any other metadata), store any data associated with the heads-up display 134, store calibration information for calibrating the heads-up display 134 or other devices in the system 100, store any of the information that may be stored in local database 124, store calculated azimuth 202 information for the vehicle 120, store GPS information for the vehicle 120, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Operatively, the system 100 may display points of interest on a heads-up display 134 of a vehicle 120, as shown in the following exemplary scenario. In the example scenario and referring to FIGS. 1-3, the first user 101 may touch a touchscreen 105 of the first user device 102 so as to activate an application that supports the displaying of points of interest on the heads-up display 134 and the communicates with the vehicle 120. Once the application is activated, a camera feed captured by the cameras 125 may be displayed through the application. The camera feed may be of an environment in front of the cameras 125 and may include anything that is in the first user's 101 field of view looking through the windshield 123. The first user 101 may touch the touchscreen 105 at a certain position while the camera feed is playing on the touchscreen 105. The system 100 may detect the touching made by the first user 101 and determine the position at which the contact was made on the touchscreen 105. The position at which the contact was made on the touchscreen 105 may correspond with one or more objects 163, 165, 167 in the field of view of the first user 102. In this example, the first user 101 may have tapped on position on the touchscreen 105 that displayed the object 163.

After detecting the contact made on the touchscreen 105 and the position at which the contact was made on the touchscreen 105, the system 100 may determine the location of the vehicle 120 (e.g. GPS coordinates, address, etc.) and the azimuth 202 (e.g. angle) of the vehicle 120 with respect to a reference point 127 in front of the vehicle 120, as shown in FIGS. 1-2. Additionally, the system 100 may determine elevation information 204 with respect to the object and/or the vehicle 120, as shown in FIG. 2. Once the vehicle location, azimuth 202, and/or elevation information 204 are determined, the system 100 may determine a distance (e.g. feet, meters, etc.) to the object 163 in real-time as the vehicle 120 is driving. Additionally, the system 100 may determine the distances to other objects in the field of view, such as, but not limited to, objects 165 and 167. The system 100 may then proceed to determine the location of the object 163 based on the vehicle location, the azimuth 202, the elevation information 204, and/or the distance to the object 163.

Once the location of the object 163 is determined, the system 100 may determine whether the location of the object 163 corresponds with a point of interest. The system 100 may determine that the location of the object corresponds with the point of interest if information in the local database 124 and/or the database 155 include entries that indicate that the location of the object 163 matches with a previously-identified point of interest. Information and metadata associated with the point of interest may be transmitted to the heads-up display device 132 of the vehicle 120. The system 100, such as via the heads-up display device 132, may calibrate the x-y location on the heads-up display 134 based on calibration offsets tailored to characteristics (e.g. viewing angle, height, etc.) of the first user 101 and/or characteristics (e.g. type of windshield, windshield angle, etc.) of the windshield 123. The heads-up display device 132 may proceed to present the calibrated point of interest information and metadata on the heads-up display 134 so that the first user 101 may view the point of interest information via the heads-up display 134 projected on the windshield 123.

The heads-up display 134 projected by the heads-up display device 132 may display a visual representation 173 of the object 163 on the heads-up display 134, a visual representation 175 of the object 165 on the heads-up display 134, a visual representation 177 of the object 167 on the heads-up display 134, along with visual representations of any other objects, as shown in FIGS. 2-3. Using the example above, the point of interest information 180 for the object 163 may be displayed in proximity to the visual representation 173 of the object 163 shown in the heads-up display 134. For example, the point of interest information 180 may indicate that the object 163 is "Store 1" that is three miles away, and "Store 1" is a restaurant. Additionally, if desired, point of interest information 182 corresponding to the object 165 may be displayed in proximity to the visual representation 175 of the object 165 shown in the heads-up display 134. For example, the point of interest information 182 may indicate that object 165 is "Store 2" that is four miles away, and "Store 2" is an electronics store.

If, for example, there is no point of interest information for object 167, then the heads-up display 134 may display information 184 indicating that the object 167 is not an identifiable point of interest, and that the object 167 is six miles away. If the object 167 is not an identifiable point of interest, the first user 101 may be given the option to input information to identify the object 167 as a point of interest in the future. In certain embodiments, the heads-up display device 132 may project a heads-up display that encompasses the entire windshield 123. In such a scenario, the heads-up display device 132 may not have to make visual representations of the objects 163, 165, 167, but, instead, can simply project the point of interest information next to the actual objects 163, 165, 167 that are within the field of view of the windshield 123. For example, in FIG. 2, point of interest information 186 associated with object 163 may be displayed in proximity to location on the windshield 123 that the first user 101 can visually see the actual object 163. In further embodiments, the system 100 may display dots/cursors 170 on the touchscreen device 130, the first user device 102, the second user device 111, the windshield 123, and/or on the heads-up display 134. Each of the dots/cursors 170 may proportionally track the movements of the other dots/cursors 170, as shown in FIG. 2. The dots/cursors 170 may be utilized by the first user 101 to select which objects 163, 165, 167 that the first user 101 wants point of interest information for. Since the dots/cursors 170 will proportionately track each other, the first user may not need to take his or her eyes off the road in order to obtain information various points of interest. For example, the first user 101 can simply see the dot/cursors 170 on the heads-up display 134 and/or windshield 123, and move their finger on the touchscreen device 130 to select an object that the first user 101 can see through the windshield 123.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, detecting a contact made on a touchscreen of the touchscreen device 130 and the first and second user devices 102, 111; determining the position at which the contact was made on the touchscreen of the touchscreen device 130 and the first and second user devices 102, 111; determining a location of the vehicle 120; determining the azimuth for the vehicle 120; determining distances to various objects in the field of view of the first and second users 101, 110, determining the locations of the objects based on the location of the vehicle 120, azimuth for the vehicle 120, and distances to the various objects in the field of view; determining if the locations of the objects correspond to points of interest; displaying information corresponding to the points of interest on a position on a heads-up display that corresponds with the position at which the contact was made on the touchscreen device 130; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-3 illustrate specific example configurations of the various components of the system 100, the system 100 may include any configuration of the components, which may include using a greater or lesser number of the components. For example, the system 100 is illustratively shown as including a first user device 102, a second user device 111, a vehicle 120, a local database 124, cameras 125, a heads-up display device 132, a touchscreen device 130, a communications network 135, a server 140, a server 145, a server 150, a server 160, and a database 155. However, the system 100 may include multiple first user devices 102, multiple second user devices 111, multiple vehicles 120, multiple local databases 124, any number of cameras 125, multiple touchscreen devices 130, multiple heads-up display devices 132, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 4:
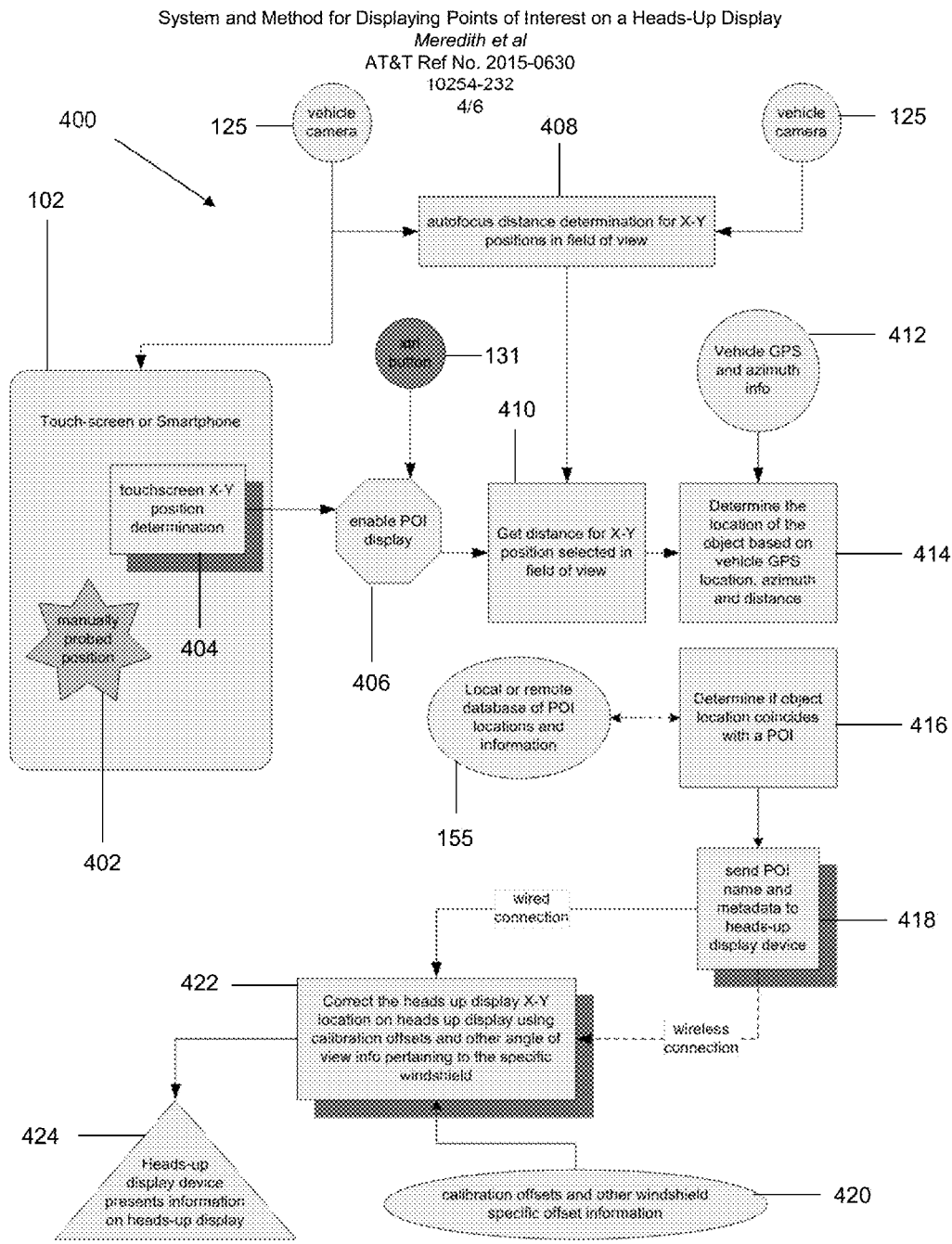
FIG. 4 is a schematic diagram illustrating a flow diagram detailing components and steps utilized in displaying points of interest on a heads-up display in an embodiment of the present disclosure.

As shown in FIG. 4, an exemplary method 400 for displaying points of interest on a heads-up display 134 is schematically illustrated. The method 400 also illustrates various components utilized to perform the method 400. The method 400 may include a sequence of steps for enabling a driver or pilot to utilize an operating mode of a touchscreen device or other device that enables the display of information associated with various points of interest on the heads-up display 134 of a vehicle 120. The method 400 may include, at step 402, detecting that a contact has been made on a touchscreen surface of a device, such as a touchscreen of touchscreen device 130 or a touchscreen 105 of first user device 102. In certain embodiments, the detecting may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device.

At step 404, the method 400 may include determining the position at which the contact was made on the touchscreen of the device. For example, the x-y coordinates may be determined for the position at which the contact was made on the touchscreen of the device. The x-y coordinates may be determined by utilizing an application executing on the touchscreen device 130, the first user device 102, the second user device 111, or any combination thereof. The position at which the contact was made may correspond with an object (e.g. object 163) that is in a field of view of a user driving a vehicle 120. For example, a camera feed may be displaying the objects in the field of view of the user on the touchscreen of the touchscreen device 130, and the user may tap on the position on the touchscreen that corresponds with the viewed object. In certain embodiments, the determination of the position may be performed by utilizing the vehicle 120, the server 140, the server 145, the server 150, the server 160, the communications network 135, any combination thereof, or by utilizing any other appropriate program, network, system, or device.

At step 406, the method 400 may include enabling the display of point of interest information. For example, if the first user 101 presses the control button of the controller 131, the display of point of interest information may be enabled. In certain embodiments, the enabling may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device. At step 408, the method 400 may include determining the distance from the vehicle 120 to the object corresponding to the position contacted on the touchscreen. For example, if the user tapped on a building that is shown in the camera feed on the touchscreen, the distance to the actual building in front of the vehicle 120 may be determined by utilizing the cameras 125 and the functionality of the system 100. In certain embodiments, the system 100 may perform one or more autofocusing techniques, such as known autofocusing techniques, to make distance determinations for x-y positions associated with one or more objects in the field of view of the user in the vehicle 120. In certain embodiments, the distance determinations may be determined by utilizing the first user device 102, the second user device 111, the vehicle 120, the cameras 125, the touchscreen device 130, the server 140, the server 145, the server 150, the server 160, the communications network 135, any combination thereof, or by utilizing any other appropriate program, network, system, or device.

At step 410, the method 400 may include obtaining the x-y positions associated with the objects in the field of view of the user and associated with where the contact was made on the touchscreen. In certain embodiments, the x-y position information for the objects and the contact on the touchscreen may be obtained by utilizing the first user device 102, the second user device 111, the vehicle 120, the cameras 125, the touchscreen device 130, the server 140, the server 145, the server 150, the server 160, the communications network 135, any combination thereof, or by utilizing any other appropriate program, network, system, or device. At step 412, the method 400 may include obtaining location information for the vehicle 120 and an azimuth 202 angle with respect to a reference point 127 in front of the vehicle 120. For example, the vehicle's 120 current location may be obtained via a GPS device of the vehicle 120 and the azimuth 202 may be determined by utilizing a compass of the vehicle 120. The location may be expressed in terms of latitude and longitude measurements and the azimuth 202 may be an angle based off the reference point 127. In certain embodiments, elevation information 204 may also be determined with respect to the object and/or the vehicle 120, and the elevation information 204 may be expressed using any type of elevation metric. In certain embodiments, the location information for the vehicle 120, the azimuth 202, and/or the elevation information 204 may be obtained by utilizing the first user device 102, the second user device 111, the vehicle 120, the cameras 125, a compass, a GPS device, the server 140, the server 145, the server 150, the server 160, the communications network 135, any combination thereof, or by utilizing any other appropriate program, network, system, or device.

Once the location information for the vehicle 120, the azimuth 202, and/or the elevation information 204 are obtained, the method 400 may include, at step 414, determining the location of the object in the user's field of view in front of the vehicle 120. The object may correspond with the object shown in the camera feed of the environment in the field of view of the user that the user tapped on the touchscreen. In certain embodiments, the determination of the location of the object may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device. After the location of the object in the user's field of view is determined, the method 400 may include, at step 416, determining if the location of the object coincides or corresponds with a point of interest. In certain embodiments, the location of the object may coincide or correspond with a point of interest if entries in the local database 124 and/or the database 155 include information that indicate that the location of the object matches with a previously-identified point of interest. In certain embodiments, the determining may be performed by utilizing the first user device 102, the second user device 111, the vehicle 120, the local database 124, the touchscreen device 130, the server 140, the server 145, the server 150, the server 160, the communications network 135, the database 155, any combination thereof, or by utilizing any other appropriate program, network, system, or device.

If the location of the object is determined to coincide or correspond with a point of interest, the method 400 may include, at step 418, transmitting information associated with the point of interest, along with accompanying metadata, to the heads-up display device 132. In certain embodiments, the information may include a name of the point of interest, for example. In certain embodiments, the metadata may include, but is not limited to, the type of point of interest, information describing the point of interest, how far the point of interest is from a current location of the vehicle 120, a rating of the point of interest, a popularity of the point of interest, an identification of other points of interest similar to the point of interest, and any other metadata, or any combination thereof. In certain embodiments, the transmitting of the information and metadata may be performed by utilizing the first user device 102, the second user device 111, the vehicle 120, the local database 124, the touchscreen device 130, the heads-up display device 132, the server 140, the server 145, the server 150, the server 160, the communications network 135, the database 155, any combination thereof, or by utilizing any other appropriate program, network, system, or device. Also, in certain embodiments, the information and metadata may be transmitted over a wired connection to the heads-up display device 132, over a wireless connection to the heads-up display device 132, or a combination thereof.

At step 420, the method 400 may include obtaining calibration offsets pertaining to the user, calibration offsets pertaining to the windshield 123, and/or other calibration offsets. In certain embodiments, calibration offsets pertaining to the user may be utilized to calibrate the heads-up display 134 projected by the heads-up display device 132 based on a variety of user-related factors. Such factors may include, but are not limited to, the user's specific viewing angle, height, torso length, seating position in the vehicle 120, and/or other characteristics. The factors may be obtained from a user profile of the user, the local database 124, and/or the database 155. The calibration offsets for the windshield 123 may indicate a type of windshield, an angle that the windshield 123 is positioned on the vehicle 123, a viewing angle for a user to effectively view information on the windshield 123, any other windshield 123 information, or any combination thereof. The calibration offsets may be obtained by utilizing the first user device 102, the second user device 111, the vehicle 120, the local database 124, the touchscreen device 130, the heads-up display device 132, the server 140, the server 145, the server 150, the server 160, the communications network 135, the database 155, any combination thereof, or by utilizing any other appropriate program, network, system, or device.

Once the calibration offsets are obtained, the method 400 may include, at step 422, adjusting and/or correcting the heads-up display 134 x-y location for displaying the heads-up display 134 by utilizing the calibration offsets relating to the user, the windshield 123, or other features. In certain embodiments, the adjusting and/or correcting may be performed by utilizing the first user device 102, the second user device 111, the vehicle 120, the local database 124, the touchscreen device 130, the heads-up display device 132, the server 140, the server 145, the server 150, the server 160, the communications network 135, the database 155, any combination thereof, or by utilizing any other appropriate program, network, system, or device. At step 424, the method 400 may include transmitting instructions to cause the heads-up display device 132 to display the point of interest information and metadata on the heads-up display 134 generated by the heads-up display device 132. In certain embodiments, the instructions may be transmitted by utilizing the first user device 102, the second user device 111, the vehicle 120, the local database 124, the touchscreen device 130, the heads-up display device 132, the server 140, the server 145, the server 150, the server 160, the communications network 135, the database 155, any combination thereof, or by utilizing any other appropriate program, network, system, or device. The method 400 may repeated as necessary, such as when new contacts or touchings are made on the touchscreen of the touchscreen device 130, the touchscreen 105 of the first user device 102, the touchscreen 114 of the second user device 111, or any combination thereof. Similarly, the method 400 may be repeated when new objects appear in the field of view of a user or at any other desired time. Notably, the method 400 may further incorporate any of the features and functionality described for the system 100, the method 500, or as otherwise described herein.

Figure 5:
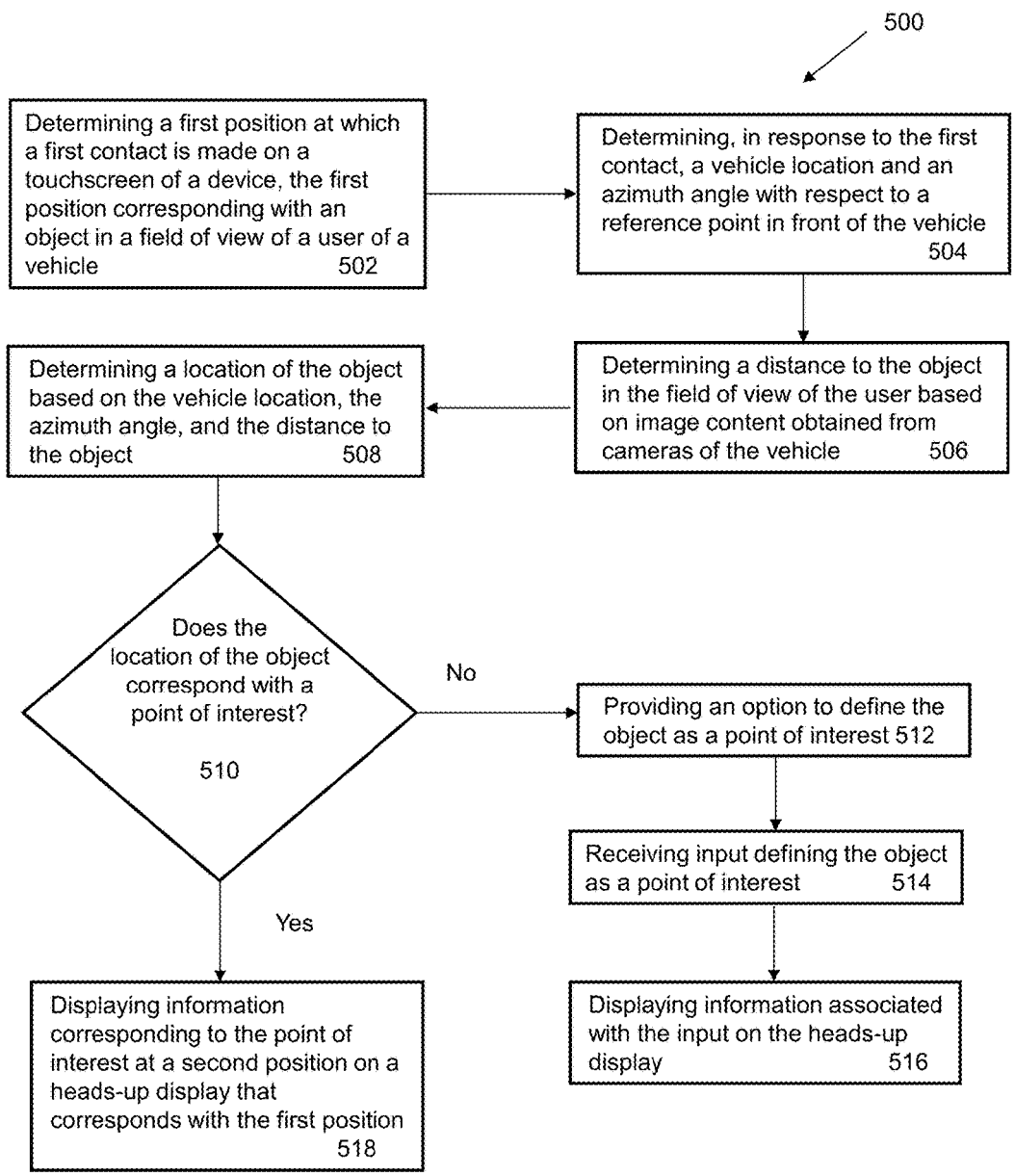
FIG. 5 is a flow diagram illustrating a sample method for displaying points of interest on a heads-up display according to an embodiment of the present disclosure.

As shown in FIG. 5, an exemplary method 500 for displaying points of interest on a heads-up display 134 is schematically illustrated. The method 500 may include steps for enabling a driver or pilot to utilize an operating mode of a touchscreen device that enables the display of information associated with various points of interest on the heads-up display 134. In particular, the method 500 may include, at step 502, determining a first position at which a first contact is made on a touchscreen of a device. The first position at which the first contact was made may correspond with an object (e.g. object 163) that is in a field of view of a user driving a vehicle 120. For example, if the device is displaying a camera feed of the environment in front of the vehicle 120, the first user 101 may see an object 163 and contact the touchscreen of the device at the location on the display of the device that the object 163 is displayed on the display of the device. In certain embodiments, the determining of the first position may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device.

At step 504, the method 500 may include determining, in response to the first contact, a vehicle location of the vehicle 120 and an azimuth 202 with regard to a reference point 127 in front of the vehicle 120. The vehicle location may be determined by a GPS device of the vehicle 120 and the azimuth 202 may be determined by utilizing a compass of the vehicle 120. In certain embodiments, elevation information 204 may also be determined with respect to the object and/or the vehicle 120. In certain embodiments, the determining may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device. At step 506, the method 500 may include determining a distance to the object in the field of view of the user. The distance to the object may be determined based on an analysis of image content and/or motion content captured by the cameras 125 of the vehicle 120. In certain embodiments, the determining may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device.

At step 508, the method 500 may include determining a location of the object based on the determined vehicle location, the azimuth 202 of the vehicle 120, the measured distance to the object corresponding to the first position at which the first contact was made. In certain embodiments, the location of the object may also be determined based on the elevation information 204. In certain embodiments, the determining of the location may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device. Once the location of the object is determined, the method 500 may include, at step 510, determining if the location of the object corresponds with a point of interest. In certain embodiments, the location of the object may correspond with the point of interest if information in the local database 124 and/or the database 155 include entries that indicate that the location of the object matches with a previously-identified point of interest. For example, if the location of the object is determined to currently be two miles away from the vehicle's 120 location and is located at a certain latitude and longitude, these measurements may be in a database entry of the local database 124 as corresponding with a specific restaurant. In certain embodiments, the determination as to whether the location of the object corresponds with a point of interest may be performed by utilizing the first user device 102, the second user device 111, the vehicle 120, the touchscreen device 130, the server 140, the server 145, the server 150, the server 160, the communications network 135, any combination thereof, or by utilizing any other appropriate program, network, system, or device.

If the location of the object is determined to not correspond with a point of interest, the method 500 may include, at step 512, providing an option to define the object as a point of interest. For example, the option may be displayed on the heads-up display 134 and the user may be prompted to speak the name of the point of interest via an application or manually enter the name of the point of interest via the touchscreen device 130 or other device. In certain embodiments, the option may be provided by utilizing the first user device 102, the second user device 111, the vehicle 120, the heads-up display device 132, the touchscreen device 130, the server 140, the server 145, the server 150, the server 160, the communications network 135, any combination thereof, or by utilizing any other appropriate program, network, system, or device. At step 514, the method 500 may include receiving one or more inputs that define the object as a point of interest. For example, the inputs may be provided by the user through the touchscreen device 130, the first user device 102, the second user device 111, any other appropriate device, or any combination thereof. The user may input the name of the point of interest, along with additional information associated with the point of interest, such as a type of point of interest, a description of the point of interest, any information, or any combination thereof.

In certain embodiments, the inputs may be made via an application executing on the touchscreen device 130, the first user device 102, the second user device 111, or any combination thereof. In certain embodiments, the inputs may be made via a microphone of the vehicle 120. For example, a microphone of the vehicle 120 may pick up input speech from the user, and the processor 122 may translate the speech to text. In certain embodiments, the text associated with the point of interest may be received by and stored in memory 121 and/or local database 124. At step 516, the method 500 may include displaying the information associated with the input on the heads-up display 134. For example, the speech translated into text may be displayed on the heads-up display 134 in proximity to a visual representation of the object in the heads-up display 134. Upon subsequent occasions where the user encounters the same object/point of interest, the previously saved text may be displayed in the heads-up display 134 in proximity to a visual representation of the object provided in the heads-up display 134.

If the location of the object is determined to correspond with a point of interest, the method 500 may include, at step 518, displaying the information corresponding to the point of interest at a second position on the heads-up display 134 that corresponds with the first position at which the first contact was made on the touchscreen of the device. For example, as shown in FIG. 2, if the first user 101 contacts the visual representation 173 of the object 163 at a position in the top right corner of the touchscreen of touchscreen device 130, the information corresponding to the point of interest corresponding to the object 163 may be displayed in the top right corner of the heads-up display 134. For example, in FIG. 2, the information 180 "Store 1" is displayed near the visual representation 173 of the object 163 shown in the heads-up display 134. In certain embodiments, if the entire windshield 123 is serving as a heads-up display, then similar information may be displayed at a location on the windshield 123 that coincides with where the user is able to view the object. For example, in FIG. 2, the information 186 (e.g. "Store 1," "3 miles away," and/or "Restaurant") is shown in proximity to where the first user 101 can view the actual object 163 through the windshield 123. In certain embodiments, the display of the information may be performed by utilizing the first user device 102, the second user device 111, the vehicle 120, the heads-up display device 132, the touchscreen device 130, the server 140, the server 145, the server 150, the server 160, the communications network 135, any combination thereof, or by utilizing any other appropriate program, network, system, or device. Notably, the method 500 may further incorporate any of the features and functionality described for the system 100, the method 400, or as otherwise described herein.

The systems and methods disclosed herein may include additional functionality and features. For example, the systems and methods may include allowing users to specify preferences relating to navigation and points of interest. The users may set up preferences which determine which types of information associated with points of interest get displayed on the heads-up display 134. In certain embodiments, the camera feed generated by the cameras 125 may be displayed on the touchscreen of the touchscreen device 130 and the touchscreens of 105, 114 of the first and second user devices 102, 111 at the same time. In certain embodiments, the display of the camera feed amongst the various touchscreen devices may be facilitated using Bluetooth or other short-range wireless protocols. In certain embodiments, the users may touch, probe, or otherwise contact the touchscreens of the various devices in the system without having to turn their eyes towards the touchscreens. In other words, the users may contact the touchscreens while their eyes are still focused on windshield 123 of the vehicle 120 and the environment beyond the windshield 123.

In certain embodiments, the system 100 may display a dot/cursor (e.g. dot/cursor 170) on the touchscreen of the touchscreen device 130, along with similar dots/cursors on the touchscreens 105, 114 of the first and second user devices 102, 111. When the user contacts the portions on the touchscreens that display the dot/cursor, the heads-up display 134 may display a similar dot/cursor in a similar position on the heads-up display 134. The dot/cursor displayed on the heads-up display 134 may proportionately track movements of the dots/cursors on the touchscreens. For example, if the user drags the dot on the touchscreen from one location of the touchscreen to another location, the dot on the heads-up display 134 may move in a similar proportionate fashion. In certain embodiments, a joystick device, scrolling device, and/or controller may be utilized to move the dot/cursor displayed on the heads-up display 134. By double-tapping on the dot/cursor on the touchscreen or pressing a button on the joystick device, scrolling device, etc., the user may indicate that the object displayed under the dot/cursor is a point of interest or is an object that the user wants to know the point of interest information for. In response to the double-tapping and/or pressing the button, the system 100 may display the point of interest information corresponding to the object selected on the touchscreen on the heads-up display 134.

In certain embodiments, the autofocusing techniques utilized for determining the distance to various objects in the user's field of view may be any available autofocusing technique. In certain embodiments, the autofocusing technique may involve utilizing a grid superimposed on the camera feed to compute the distances from the vehicle 120 to the objects in the field of view. In certain embodiments, the autofocusing techniques may be utilized irrespective of whether a user is touching the touchscreen. In certain embodiments, based on the centroid of the cameras 125 and a vector taken off the centroid, the system 100 may determine which way the vehicle 120 is moving. In certain embodiments, the system 100 may utilize angular offsets for the vector. In certain embodiments, the system 100 may utilize elevation and azimuth offsets for each gridspot/pixel in the grid.

In certain embodiments, the calibration offsets may be associated and stored on a key fob for each user, various buttons in the driver's console of the vehicle 120, or on a remote control device. In certain embodiments, the calibration offsets may be provided to the system 100 to calibrate the heads-up display 134 when the system 100 is in a calibration mode. Notably, the systems and methods enable drivers of various type of vehicles to safely discover the name and other information about a point of interest without having to remove their eyes from the windshield 123 of the vehicle 120 they are driving/piloting. To the extent the point of interest information is available with accurate location information for moving objects, the system and methods may be utilized with military applications, air-traffic control applications, and emergency first responder applications.

Figure 6:
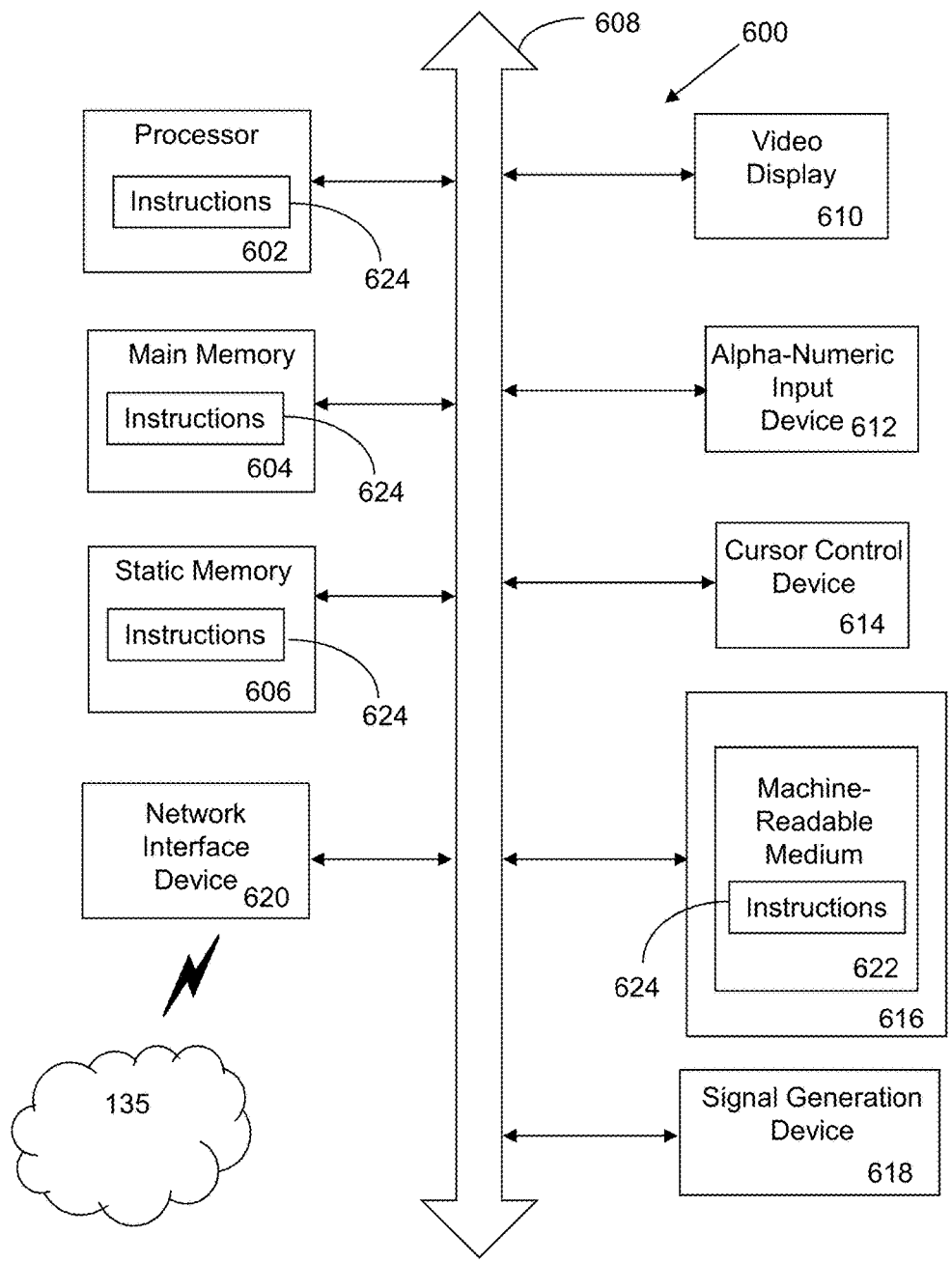
FIG. 6 is a schematic diagram of a machine in the form of a computer system within which a set of instructions, when executed, may cause the machine to perform any one or more of the methodologies or operations of the systems and methods for displaying points of interest on a heads-up display.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the vehicle 120, the heads-up display device 132, the heads-up display 134, the touchscreen device 130, the server 140, the server 145, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a memory that stores instructions;
    a processor that executes the instructions to perform operations, the operations comprising:
        determining a first position at which a first contact is made on a touchscreen of a device, wherein the first position corresponds with an object in a field of view of a user of a vehicle;
        determining, in response to the first contact, a vehicle location and an azimuth angle with respect to a reference point in front of the vehicle;
        determining a distance to the object in the field of view of the user, wherein the distance is determined from image content obtained from a camera of the vehicle;
        determining a location of the object based on the vehicle location, the azimuth angle, and the distance to the object;
        determining if the location of the object corresponds with a point of interest; and
        displaying, if the location of the object is determined to correspond with the point of interest, information corresponding to the point of interest on a second position of a heads-up display of the vehicle, wherein the second position of the heads-up display corresponds with the first position at which the first contact was made on the touchscreen of the device.

2. The system of claim 1, wherein the operations further comprise determining a calibration offset for adjusting display of the information on the heads-up display, wherein the calibration offset corresponds with a viewing angle of the user.

3. The system of claim 2, wherein the operations further comprise determining a third position of the heads-up display for displaying the information corresponding to the point of interest, wherein the third position is determined based on the calibration offset.

4. The system of claim 3, wherein the operations further comprise displaying the information corresponding to the point of interest on the third position of the heads-up display of the vehicle.

5. The system of claim 1, wherein the operations further comprise displaying, on the device, the image content obtained from the camera of the vehicle.

6. The system of claim 1, wherein the operations further comprise determining the second position of the heads-up display based on offset information corresponding to a windshield of the vehicle.

7. The system of claim 1, wherein the operations further comprise transmitting the information corresponding to the point of interest and metadata associated with the point of interest to a heads-up display device generating the heads-up display.

8. The system of claim 1, wherein the operations further comprise determining the distance to the object in the field of view of the user by applying an autofocusing technique on the image content.

9. The system of claim 1, wherein the operations further comprise receiving, from the user, a preference associated with displaying the information corresponding to the point of interest, wherein the information is displayed on the heads-up display based on the preference.

10. The system of claim 1, wherein the operations further comprise determining the location of the object based on an elevation measurement determined with respect to the reference point.

11. The system of claim 1, wherein the operations further comprise adjusting a color of the heads-up display.

12. The system of claim 1, wherein the operations further determining a third position at which a second contact is made on the touchscreen of the device, wherein the second position corresponds with a different object in the field of view of the user of the vehicle, and wherein the operations further comprise displaying different information corresponding to a different point of interest on a fourth position of the heads-up display of the vehicle, wherein the fourth position of the heads-up display corresponds with the third position at which the second contact was made on the touchscreen of the device, wherein the different point of interest corresponds with the different object.

13. The system of claim 1, wherein the operations further comprise determining the distance to the object in real-time as the vehicle approaches the object.

14. A method, comprising:
   determining a first position at which a first contact is made on a touchscreen of a device, wherein the first position corresponds with an object in a field of view of a user of a vehicle;
   determining, in response to the first contact, a vehicle location and an azimuth angle with respect to a reference point in front of the vehicle;
   determining a distance to the object in the field of view of the user, wherein the distance is determined from image content obtained from a camera of the vehicle;
   determining a location of the object based on the vehicle location, the azimuth angle, and the distance to the object;
   determining, by utilizing instructions from a memory that are executed by a processor, if the location of the object corresponds with a point of interest; and
   displaying, if the location of the object is determined to correspond with the point of interest, information corresponding to the point of interest on a second position of a heads-up display of the vehicle, wherein the second position of the heads-up display corresponds with the first position at which the first contact was made on the touchscreen of the device, and wherein the second position is calibrated based on a calibration offset associated with the user.

15. The method of claim 14, further comprising displaying different information corresponding to a different point of interest on a third position of the heads-up display.

16. The method of claim 14, further comprising adjusting a brightness level of the heads-up display.

17. The method of claim 14, further comprising determining that the location of the object corresponds with the point of interest based on determining that the location of the object is matched with the point of interest in a list in a database.

18. The method of claim 14, further comprising displaying a visual representation of a dot on the heads-up display that corresponds with the first contact made on the touchscreen of the device.

19. The method of claim 18, further comprising moving the visual representation of the dot on the heads-up display in a manner that tracks additional contacts made by the user on the touchscreen of the device.

20. A computer-readable device comprising instructions, which when executed by a processor, cause the processor to perform operations comprising:
   determining a first position at which a first contact is made on a touchscreen of a device, wherein the first position corresponds with an object in a field of view of a user of a vehicle;
   determining, in response to the first contact, a vehicle location and an azimuth angle with respect to a reference point in front of the vehicle;
   determining a distance to the object in the field of view of the user, wherein the distance is determined from image content obtained from a camera of the vehicle;
   calculating a location of the object based on the vehicle location, the azimuth angle, and the distance to the object;
   determining if the location of the object corresponds with a point of interest; and
   displaying, if the location of the object is determined to correspond with the point of interest, information corresponding to the point of interest on a second position of a heads-up display of the vehicle, wherein the second position of the heads-up display corresponds with the first position at which the first contact was made on the touchscreen of the device.

* * * * *